US012602737B2

(12) United States Patent
Jin et al.

(10) Patent No.: US 12,602,737 B2
(45) Date of Patent: Apr. 14, 2026

(54) RAPID RECONSTRUCTION OF HIGH RESOLUTION IMAGES FROM LOWER RESOLUTION IMAGES

(71) Applicant: International Business Machines Corporation, Armonk, NY (US)

(72) Inventors: Xiao Jin, Jersey City, NJ (US); Chulin Wang, Evanston, IL (US); Andrés Codas Duarte, Rio de Janeiro (BR); Kyong Min Yeo, Scarsdale, NY (US); Levente Klein, Tuckahoe, NY (US); Bruce Gordon Elmegreen, Goldens Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 18/203,710

(22) Filed: May 31, 2023

(65) Prior Publication Data

US 2024/0404001 A1 Dec. 5, 2024

(51) Int. Cl.
*G06T 3/4007* (2024.01)
*G06T 3/4046* (2024.01)
*G06T 7/00* (2017.01)

(52) U.S. Cl.
CPC .......... *G06T 3/4007* (2013.01); *G06T 3/4046* (2013.01); *G06T 7/0002* (2013.01);
(Continued)

(58) Field of Classification Search
CPC ... G06T 3/4007; G06T 3/4046; G06T 7/0002; G06T 2207/10032; G06T 2207/20081;
(Continued)

(56) References Cited

U.S. PATENT DOCUMENTS

| | | | |
|---|---|---|---|
| 10,346,740 B2 | 7/2019 | Zhang | |
| 10,372,846 B2 | 8/2019 | Bai | |

(Continued)

FOREIGN PATENT DOCUMENTS

| | | |
|---|---|---|
| CN | 109313724 B | 6/2021 |
| CN | 112991181 A | 6/2021 |

OTHER PUBLICATIONS

"An overview of the Raster Interpolation toolset," ArcGIS 10.3, Environmental Systems Research Institute, Inc., 2016, 2 pages.
(Continued)

*Primary Examiner* — Matthew C Bella
*Assistant Examiner* — Daniel Joseph Santos
(74) *Attorney, Agent, or Firm* — Kristofer Haggerty

(57) ABSTRACT

An approach is disclosed that receives a time sequence of low-resolution images, each of the low-resolution images depicting a physics event. The approach interpolates two adjacent low-resolution images to a higher spatial-resolution interpolated image between a first and a second time. The approach then inputs a previous high-resolution image and the interpolated image to a neural network that includes a physics constraint that corresponds to the physics event. A new high-resolution image is received from the neural network, with the new image corresponding to the inputted previous high-resolution image and the interpolated image. The neural network is trained to minimize the mean squared difference between a smoothed version of the output and the input at the same time plus the difference between the high-resolution output and a second relevant physics equation.

17 Claims, 8 Drawing Sheets

(52) U.S. Cl.
CPC .............. *G06T 2207/10032* (2013.01); *G06T 2207/20081* (2013.01); *G06T 2207/20084* (2013.01); *G06T 2207/30192* (2013.01)

(58) Field of Classification Search
CPC . G06T 2207/20084; G06T 2207/30192; G06T 3/4053
USPC ........................................................ 382/156
See application file for complete search history.

(56) References Cited

U.S. PATENT DOCUMENTS

| | | | |
|---|---|---|---|
| 10,970,820 | B2 | 4/2021 | El-Khamy |
| 2017/0140075 | A1 | 5/2017 | Bai et al. |
| 2018/0075581 | A1 | 3/2018 | Shi |
| 2021/0089275 | A1 | 3/2021 | Dey |
| 2021/0271934 | A1 | 9/2021 | White |
| 2021/0398289 | A1* | 12/2021 | Schmidt et al. .......... G06T 7/13 |
| 2022/0188629 | A1 | 6/2022 | O'Donncha |
| 2022/0222776 | A1* | 7/2022 | Porikli et al. |
| 2023/0418999 | A1* | 12/2023 | van Kessel et al. .... G06F 30/27 |
| 2024/0005451 | A1* | 1/2024 | Patil et al. ............ G06T 3/4076 |
| 2024/0065613 | A1* | 2/2024 | Kandlikar et al. ... A61B 5/4312 |
| 2024/0185383 | A1* | 6/2024 | Hong et al. ........... G06T 3/4046 |
| 2024/0312174 | A1* | 9/2024 | Savanur et al. ....... G06V 10/25 |

OTHER PUBLICATIONS

"ChaofWang / Awesome-Super_Resolution," GitHub, Inc., 2022, 11 pages.

Matcha, "A Review of Super-Resolution," Paperspace Blog, 2020, 21 pages.

"RAP-Smoke Model Fields," Global Systems Laboratory, Aug. 2022, 1 page.

Wang et al., "S3RP: Self-Supervised Super-Resolution and Prediction for Advection-Diffusion Process," Fourth Workshop on Machine Learning and the Physical Sciences (NeurIPS 2021), 35th Annual Conference on Neural Information Processing Systems, Dec. 2021, 9 pages.

Mukherjee, et al., "A Complete Guide to Image Super-Resolution in Deep Learning and AI", AI/ML, Apr. 1, 2025, 24 Pages.

* cited by examiner

100

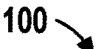

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

PHYSICS-BASED LOGIC FOR GENERATING HIGH RESOLUTION IMAGES FROM LOW RESOLUTION IMAGES

195

PERIPHERAL DEVICE SET 114

| UI DEVICE SET 123 | STORAGE 124 | IoT SENSOR SET 125 |

NETWORK MODULE 115

*FIG. 1*

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

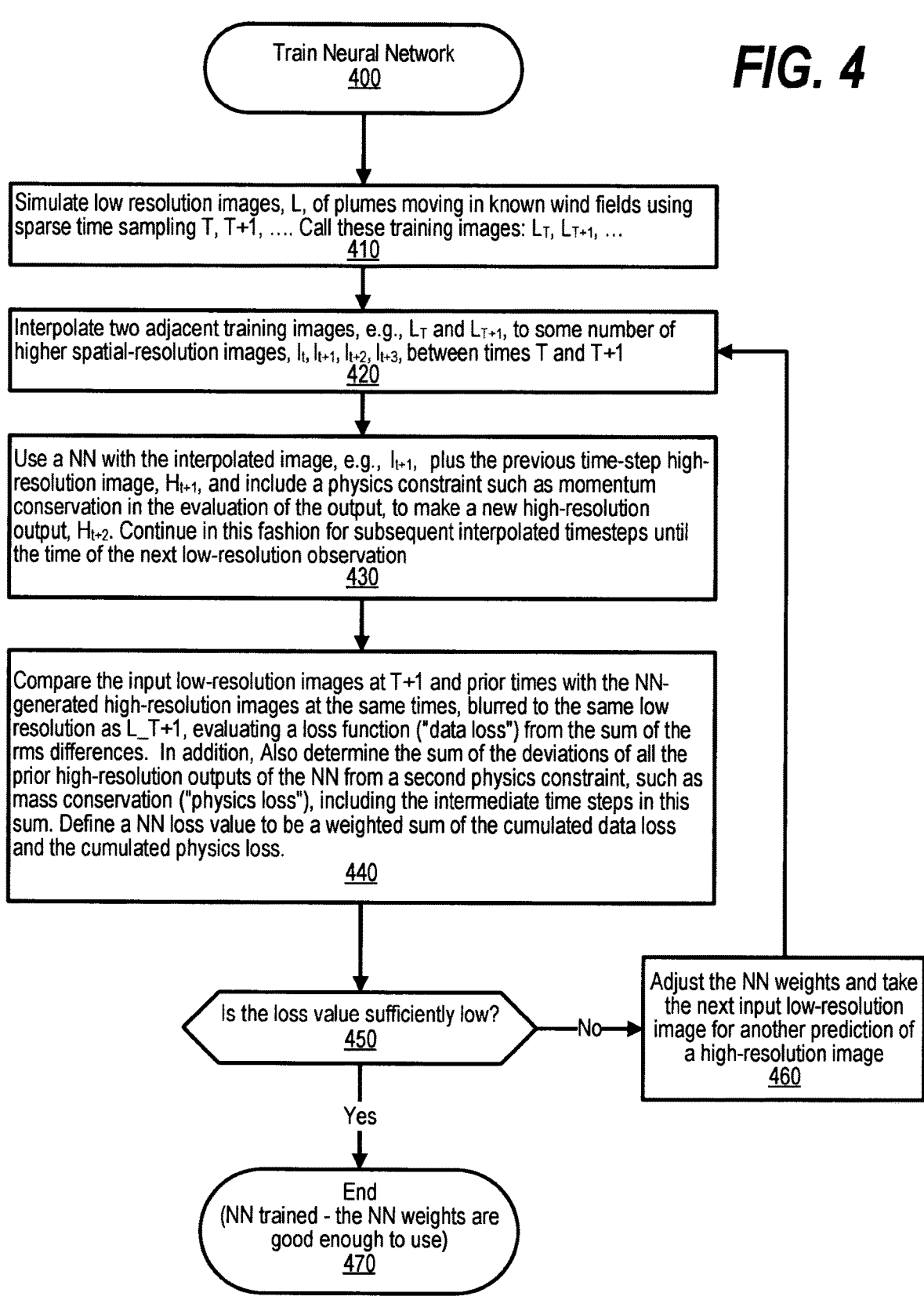

FIG. 4

Train Neural Network
400

Simulate low resolution images, L, of plumes moving in known wind fields using sparse time sampling T, T+1, .... Call these training images: $L_T$, $L_{T+1}$, ...
410

Interpolate two adjacent training images, e.g., $L_T$ and $L_{T+1}$, to some number of higher spatial-resolution images, $I_t$, $I_{t+1}$, $I_{t+2}$, $I_{t+3}$, between times T and T+1
420

Use a NN with the interpolated image, e.g., $I_{t+1}$, plus the previous time-step high-resolution image, $H_{t+1}$, and include a physics constraint such as momentum conservation in the evaluation of the output, to make a new high-resolution output, $H_{t+2}$. Continue in this fashion for subsequent interpolated timesteps until the time of the next low-resolution observation
430

Compare the input low-resolution images at T+1 and prior times with the NN-generated high-resolution images at the same times, blurred to the same low resolution as L_T+1, evaluating a loss function ("data loss") from the sum of the rms differences. In addition, Also determine the sum of the deviations of all the prior high-resolution outputs of the NN from a second physics constraint, such as mass conservation ("physics loss"), including the intermediate time steps in this sum. Define a NN loss value to be a weighted sum of the cumulated data loss and the cumulated physics loss.
440

Is the loss value sufficiently low?
450

Adjust the NN weights and take the next input low-resolution image for another prediction of a high-resolution image
460

No

Yes

End
(NN trained - the NN weights are good enough to use)
470

Gaussian plume model
Advection-diffusion equation:

$$\partial_t C + \nabla \cdot (Cu) - \nabla(K \cdot \nabla C) - S = 0$$

610

620

Low resolution

High resolution

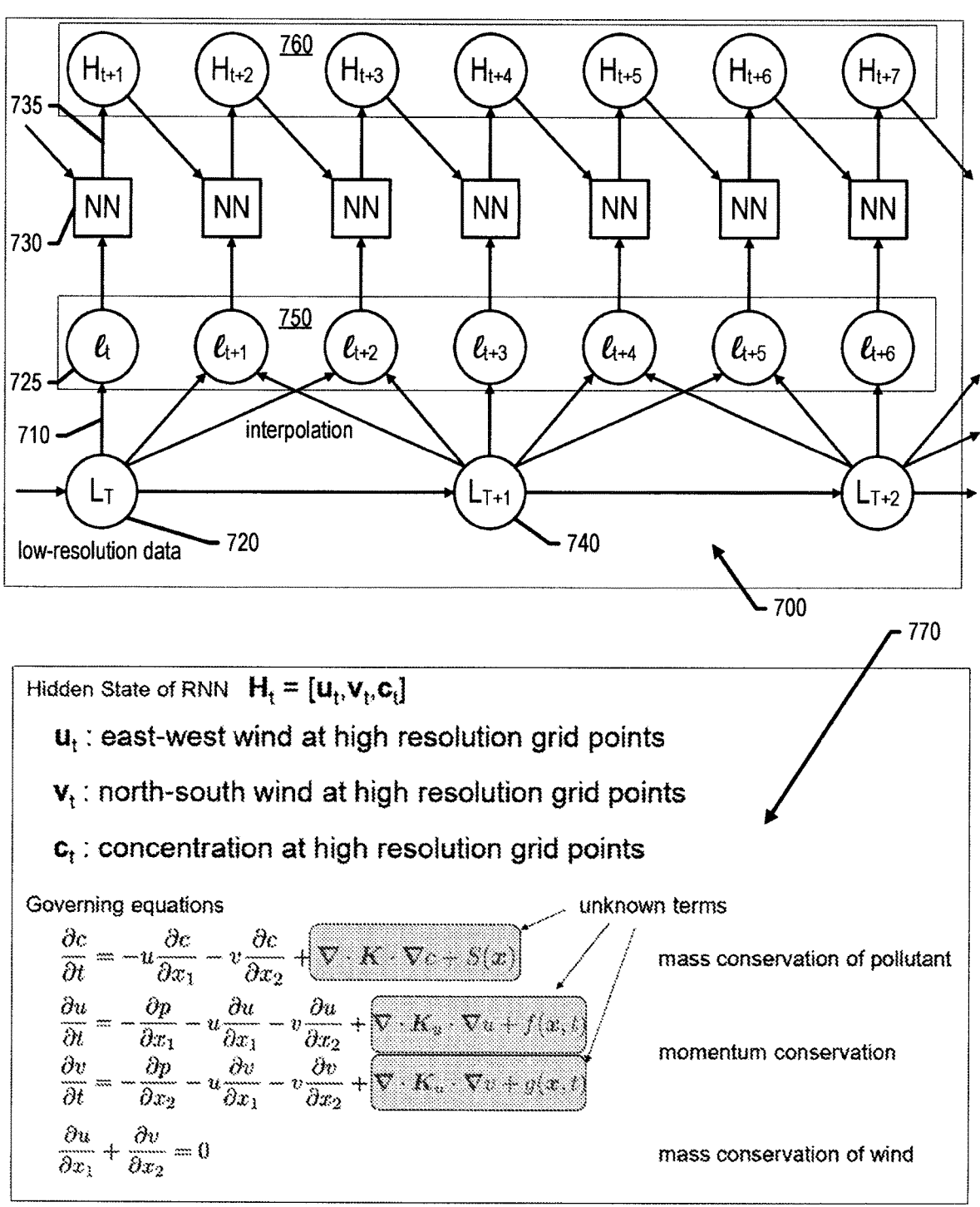

Hidden State of RNN   $H_t = [u_t, v_t, c_t]$ $u_t$ : east-west wind at high resolution grid points $v_t$ : north-south wind at high resolution grid points $c_t$ : concentration at high resolution grid points Governing equations unknown terms $$\frac{\partial c}{\partial t} = -u \frac{\partial c}{\partial x_1} - v \frac{\partial c}{\partial x_2} + \boxed{\nabla \cdot K \cdot \nabla c - S(x)}$$   mass conservation of pollutant $$\frac{\partial u}{\partial t} = -\frac{\partial p}{\partial x_1} - u \frac{\partial u}{\partial x_1} - v \frac{\partial u}{\partial x_2} + \boxed{\nabla \cdot K_u \cdot \nabla u + f(x,t)}$$

$$\frac{\partial v}{\partial t} = -\frac{\partial p}{\partial x_2} - u \frac{\partial v}{\partial x_1} - v \frac{\partial v}{\partial x_2} + \boxed{\nabla \cdot K_v \cdot \nabla v + g(x,t)}$$   momentum conservation $$\frac{\partial u}{\partial x_1} + \frac{\partial v}{\partial x_2} = 0$$   mass conservation of wind

*FIG. 7*

Typical numerical solution of the transport equation

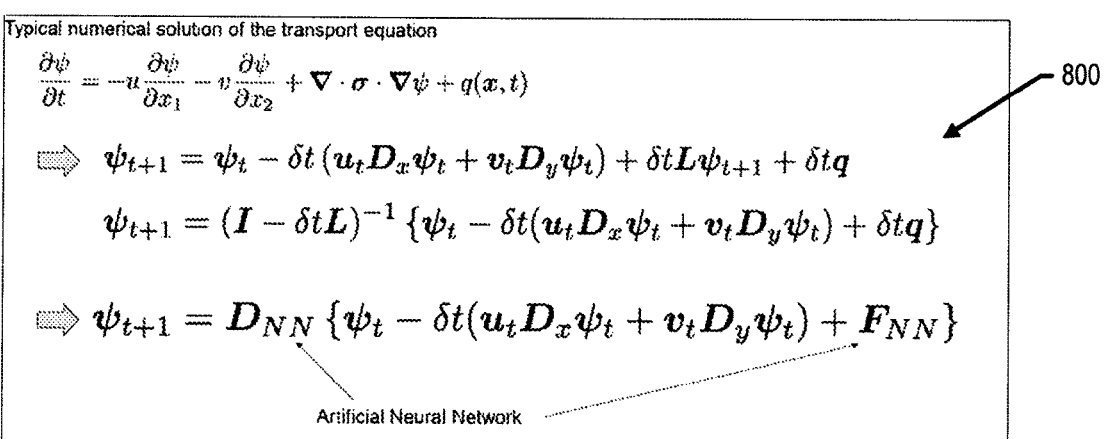

$$\frac{\partial \psi}{\partial t} = -u\frac{\partial \psi}{\partial x_1} - v\frac{\partial \psi}{\partial x_2} + \nabla \cdot \sigma \cdot \nabla \psi + q(x, t)$$

$$\Rightarrow \quad \psi_{t+1} = \psi_t - \delta t\left(u_t D_x \psi_t + v_t D_y \psi_t\right) + \delta t L \psi_{t+1} + \delta t q$$

$$\psi_{t+1} = (I - \delta t L)^{-1}\left\{\psi_t - \delta t(u_t D_x \psi_t + v_t D_y \psi_t) + \delta t q\right\}$$

$$\Rightarrow \quad \psi_{t+1} = D_{NN}\left\{\psi_t - \delta t(u_t D_x \psi_t + v_t D_y \psi_t) + F_{NN}\right\}$$

Artificial Neural Network

— 800

— 810

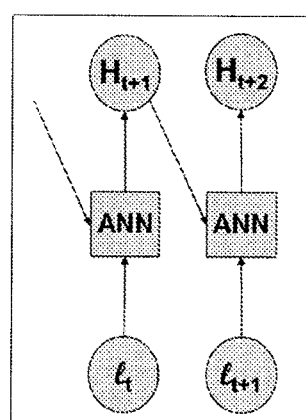

Update rule of the hidden state of Physics RNN $$[M_c, M_u, M_v, F_c, F_u, F_v] = \text{ANN}(c_t, u_t, v_t, \ell_t)$$

$$c_{t+1} = M_c\left\{c_t - \delta t(u_t D_x c_t + v_t D_y c_t) + F_c\right\}$$
$$u_{t+1} = M_u\left\{u_t - \delta t(u_t D_x u_t + v_t D_y u_t) + F_u\right\}$$
$$v_{t+1} = M_v\left\{v_t - \delta t(u_t D_x v_t + v_t D_y v_t) + F_v\right\}$$

\* $0 < M_c, M_u, M_v < 1$, e.g, sigmoid function

— 820

Loss function   $\mathcal{L} = \mathcal{L}_{data} + \lambda \mathcal{L}_{div}$ data misfit:   $\mathcal{L}_{data} = \sum\limits_{t=1}^{T} \|L_t - AH_{t \times sr_t}\|_2^2$   \* A: spatial average mass conservation:   $\mathcal{L}_{div} = \sum\limits_{t=1}^{T \times sr_t} \|D_x u_t + D_y v_t\|_2^2$   | Physics Constrain

*FIG. 8*

RAPID RECONSTRUCTION OF HIGH RESOLUTION IMAGES FROM LOWER RESOLUTION IMAGES

BACKGROUND

Natural observations, such as images captured by orbiting satellites, often provide low-resolution data that are too coarse to identify individual entities. For example, a pollution source observation using satellites generally provides images that are too coarse to identify individual pollution sources. Sentinel-5 is an Earth observation mission from the Copernicus Program developed and operated by the European Space agency that systematically acquires optical imagery over land and coastal waters. A typical Sentinel 5 image has a resolution of approximately 5 kilometers, while a pollution source, such as a well pad, might have a size of only 100 meters. Consequently, there may be many possible targets, such as pollution emission sources, in a given resolution area. Identifying the probability of any source to emit can enable mitigation to eliminate fugitive emission sources.

SUMMARY

An approach is disclosed that receives low-resolution images, each of the low-resolution images depicting a physics event. The approach interpolates two adjacent low-resolution images to a higher spatial-resolution interpolated image between a first and a second time. The approach then inputs a previous high-resolution image and the interpolated image to a neural network that includes a physics constraint that corresponds to the physics event. A new high-resolution image is received from the neural network, with the new image corresponding to the inputted previous high-resolution image and the interpolated image.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 1 is a block diagram of a data processing system in which the methods described herein can be implemented;

FIG. 4 is a flowchart depicting steps used in training a physics-informed neural network;

FIG. 7 is a diagram depicting the physics-informed neural network, the hidden state of the neural network, and the governing equations in a Gaussian plume model to identify a pollution source; and FIG. 8 is a diagram depicting a typical numerical solution to a transport equation, an update to the rule of the physics state in the physics-informed neural network, and additional equations used in one embodiment.

DETAILED DESCRIPTION

Figure 2:
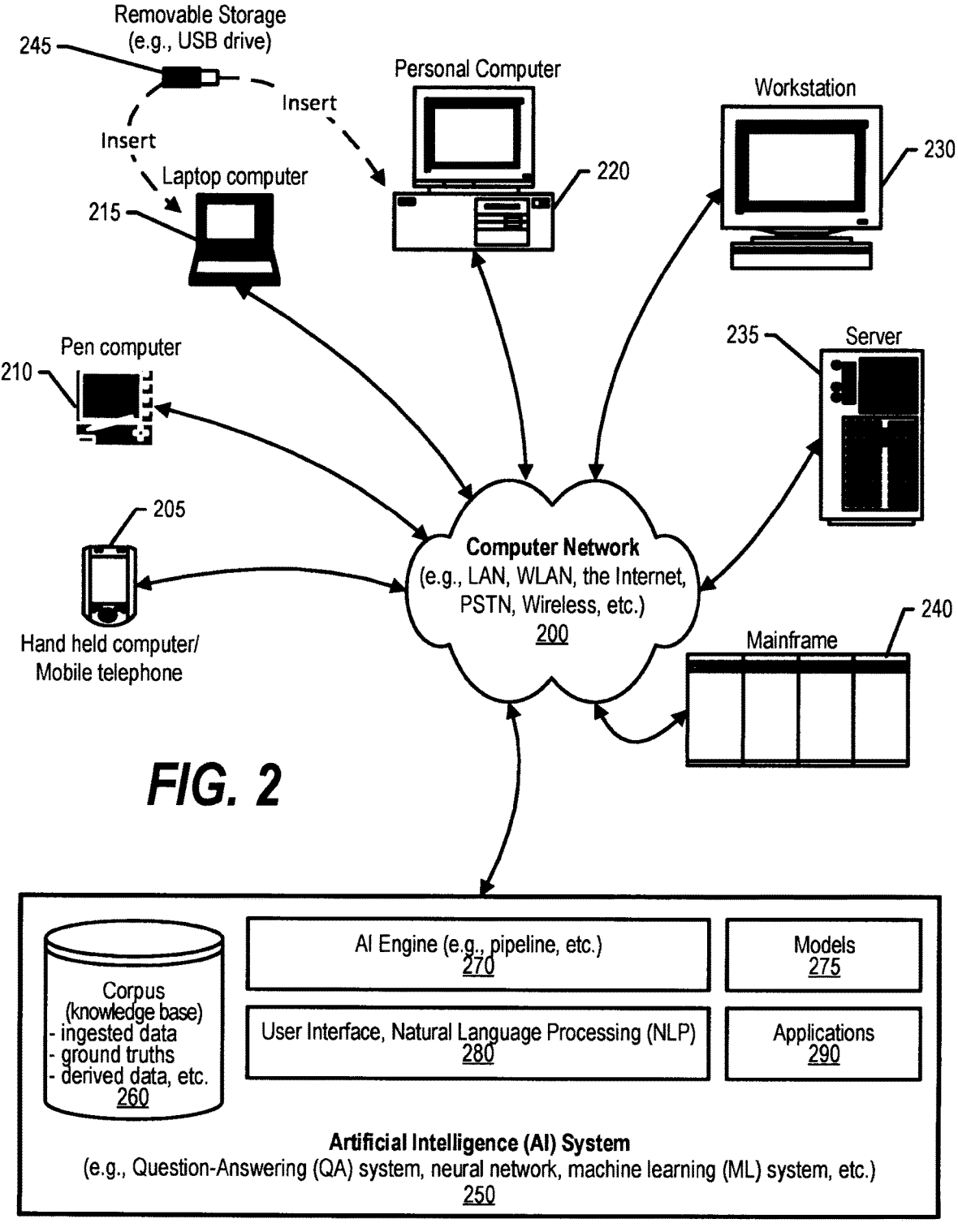
FIG. 2 provides an extension of the information handling system environment shown in FIG. 1 to illustrate that the methods described herein can be performed on a wide variety of information handling systems which operate in a networked environment.

FIGS. 1-8 describe an approach that generates high resolution data from low resolution data using a physics-informed trained neural network (NN). The approach described herein takes data images at low spatial resolution and with a low frequency of time sampling and generates high spatial resolution images with a high frequency of time sampling. The purpose of this might be to locate pollution emission sources more precisely from infrequent, low-resolution images or other data. This novel approach uses a neural network (NN) that includes, as an integral part, the Navier-Stokes equation for conservation of momentum. The procedure follows these general steps outlined in more detail with the description of figures, below.

Starting with a low-resolution image, a synthetic high-resolution image is generated by conventional means, such as interpolation to smaller image pixels. Using now the next low-resolution image at a subsequent time in a series of input image timesteps, a synthetic high-resolution image at an intermediate time is generated by interpolation over the two times and by another conventional interpolation of the intermediate-time image to smaller pixels. These two synthetic high-resolution images are then input to a NN that is designed to converge on certain unknown quantities in a physics equation that contributes to the events in the images. In the example given below, this equation is the Navier-Stokes equation, and the images concern the formation and dispersal of pollution plumes, but the method is generalizable to other equations and physical processes. The Navier Stokes equation can be used to enforce momentum conservation for the pollutants or wind conditions. The output of the NN is a high-resolution synthetic image at the intermediate time, constrained by the physics equation with the current values of the unknown quantities.

Using still the initial and second input low-resolution images, a next synthetic high-resolution image is generated at a next intermediate time, again by interpolation over time and space, and input to the NN along with the most recently generated synthetic high-resolution image that was output from the previous operation of the NN. The output of this second NN step is a new set of values for the unknown quantities and a new synthetic high-resolution image, appropriate to the current intermediate time step. This process of interpolation over time and space between two input low-resolution images continues until the time of the second input image, at which point the NN output of the current synthetic high-resolution image is spatially degraded into the same low resolution as the input image. The number of intermediate time steps between the input time steps, and the increase in resolution from the low to the high-resolution images, can be specified by the user.

The root mean squared (rms) difference between the two low-resolution images, one input and the other the degraded output of the NN at the same timestep, is determined. This rms difference is part of the loss function for training the NN, along with another part of the loss function, which is the deviation of the synthetic high-resolution image from satisfying a second physics equation. That is, the numerical values of the synthetic high-resolution image are combined as they would be in a second physics equation and their rms deviation from satisfying this equation is determined. In the example given below, this second equation is the mass conservation equation for images of the wind speed.

These two rms deviations, one from the image difference and the other from a physics equation, are combined with a weighting function that determines the relative importance of each, to give the net loss function for the NN. The weighting function can be specified by the user. Feedback to the weights in the NN are then designed to minimize this net loss function, considering multiple inputs of low-resolution images, their time and space-interpolated high-resolution intermediate images, and the combinations of these with the synthetic high-resolution outputs from the previous applications of the NN. Eventually, after many input low-resolution images, the NN becomes trained to convert a time sequence of low-resolution images into a more frequent time series of high-resolution images that satisfy the same underlying physical equations that determine the numerical values in the input images.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (UIs) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
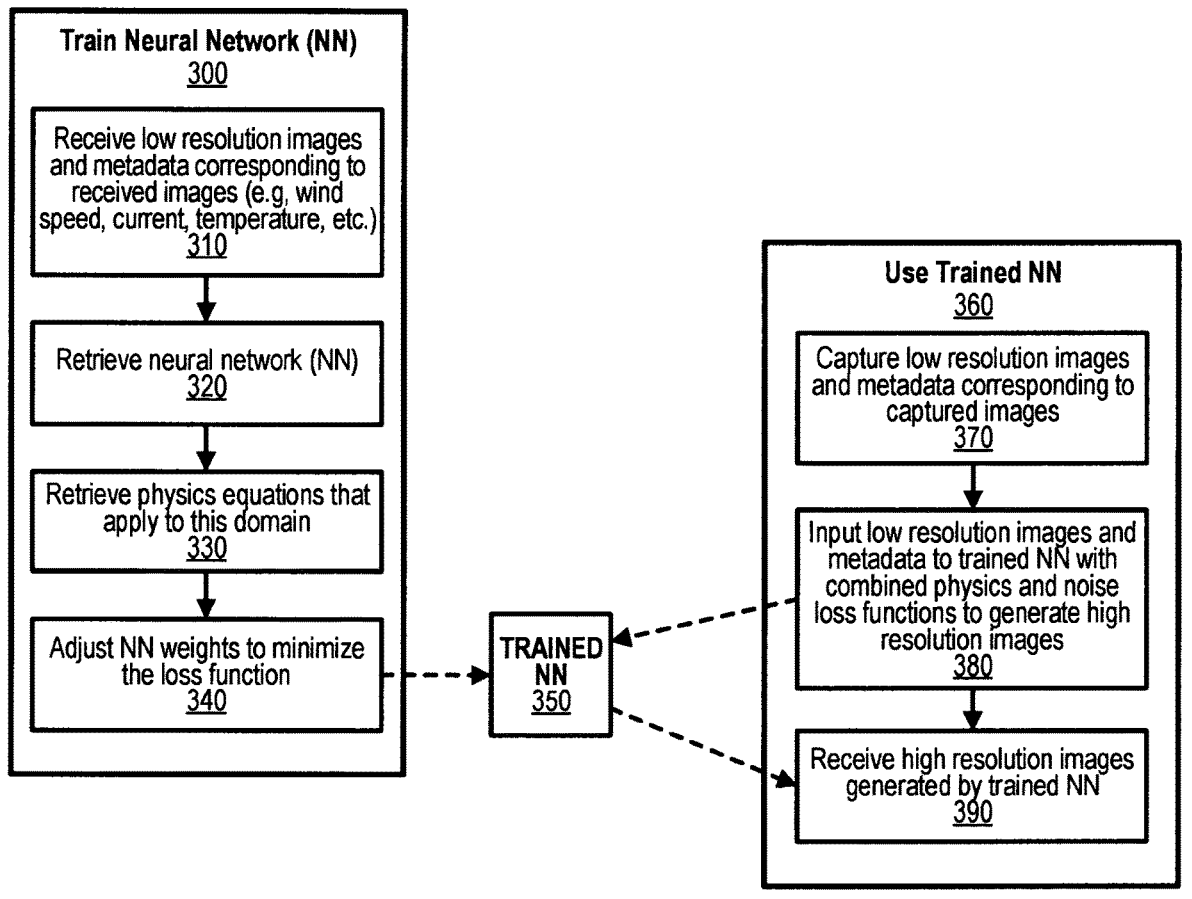
FIG. 3 is a diagram depicting the training and usage of a neural network using physics equations.

FIG. 3 is a diagram depicting the training and usage of a neural network using physics equations. Steps shown to train the neural network are shown in box 300 and steps that utilize the trained neural network are shown in box 360. High level steps used to train the neural network (box 300) are shown in steps 310 through 340. At step 310, the process receives a set of low-resolution images and metadata corresponding to the received images. Some of the metadata includes parameters that would be used in physics equations pertaining to the images (e.g., wind speed, current, temperature, etc.). At step 320, the process retrieves neural network (NN) 350 that is being trained. At step 330, the process retrieves the physics equations that apply to this domain, such as the advection-diffusion equation when the domain is analyzing an airborne pollutant. At step 340, the process adjusts the NN weights to minimize the loss function. In one embodiment, one or more physics equations are used in the training of the NN and one or more different physics equations are used in the loss function.

High level steps that utilize the trained neural network (box 360) are shown in steps 370 through 390. At step 370, the process captures a set of low-resolution images and metadata corresponding to the captured images. At step 380, the process inputs the low-resolution images and the metadata to trained NN 350 trained with the combined physics and noise loss functions to generate a set of high-resolution images. At step 390, the process receives the high-resolution images that were generated by trained NN 350.

FIG. 4 is a flowchart depicting steps used in training a physics-informed neural network. FIG. 4 processing commences at 400 and shows the steps taken by a process that trains a physics-informed neural network. At step 410, the process simulates low resolution images, L, of plumes moving in known wind fields using sparse time sampling T, T+1, . . . . These training images are referred to as $L_T$, $L_{T+1}$, etc.

At step 420, the process interpolates two adjacent training images, e.g., $L_T$ and $L_{T+1}$, to some number of higher spatial-resolution images, $I_t$, $I_{t+1}$, $I_{t+2}$, $I_{t+3}$, between times T and T+1. At step 430, the process uses a NN with the interpolated image, e.g., $I_{t+1}$, plus the previous time-step high-resolution image, $H_{t+1}$, and includes a physics constraint such as momentum conservation in the evaluation of the output, to make a new high-resolution output, $H_{t+2}$. The process continues in this fashion for subsequent interpolated timesteps until the time of the next low-resolution observation.

At step 440, the process compares all the input low-resolution images at time T+1, $L_{T+1}$, and prior times with all the NN-generated high-resolution images at T+1, $H_{T+1}$, and prior times, blurred to the same low resolution as $L_{T+1}$, evaluating a loss function from the sum of the rms differences between the two images at those times ("data loss"). The process also determines the sum of the deviations of the current and prior high-resolution output images from the NN, including those at intermediate times, from a physics constraint such as mass conservation ("physics loss"). This second physics constraint differs from the one intrinsic to the NN. The loss function for the NN is then taken to be a weighted sum of the data loss and the physics loss. The process determines whether the loss value is sufficiently low (decision 450). If the loss value is not yet sufficiently low, then decision 450 branches to the 'no' branch which, at step 460, adjusts the NN weights and takes the next input low-resolution image for another prediction of a high-resolution image and then loops back to step 420 to process the next low-resolution image. This looping continues until the loss value is sufficiently low, at which point decision 450 branches to the 'yes' branch exiting the loop. FIG. 4 processing thereafter ends at 470.

Figure 5:
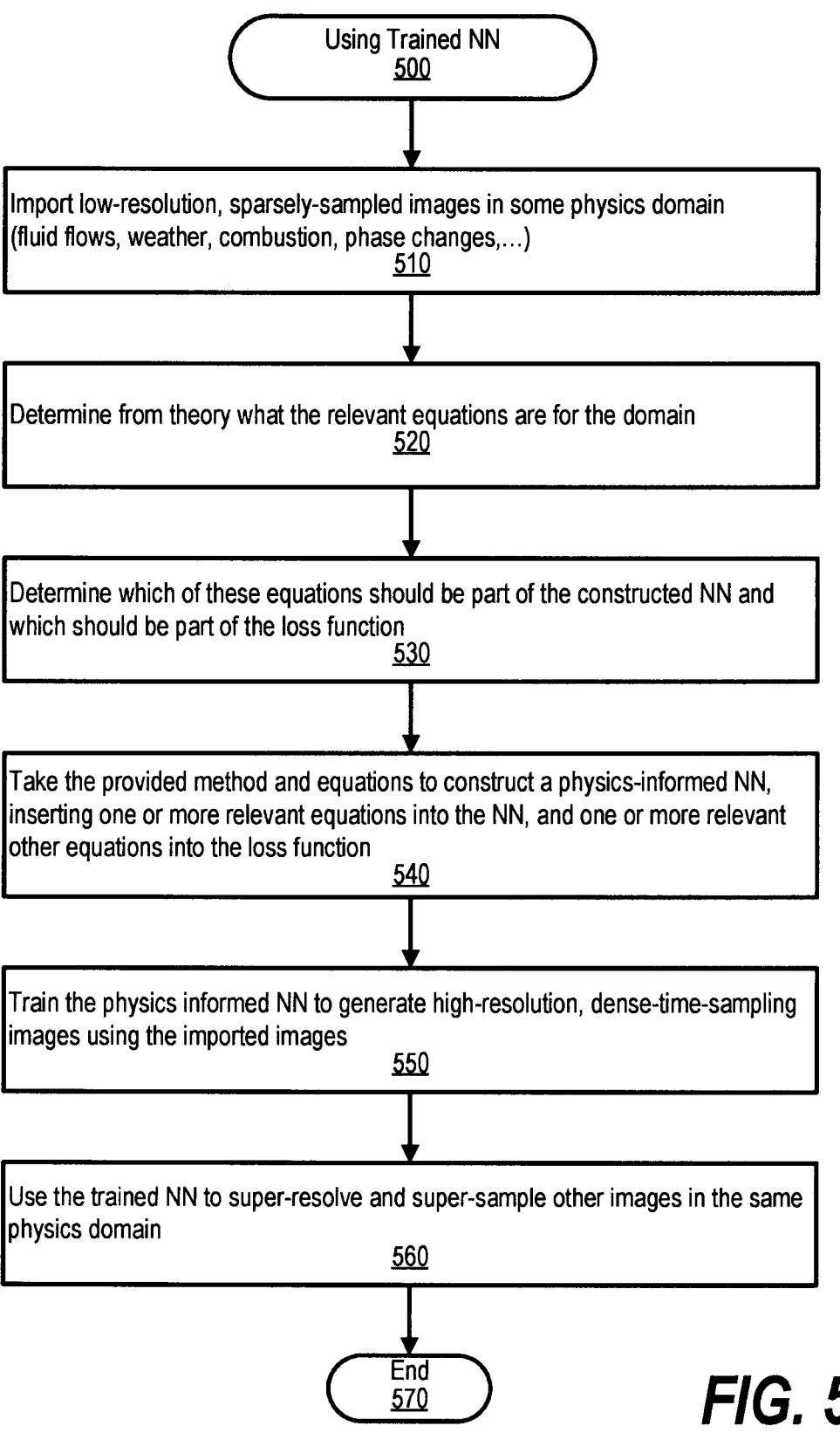
FIG. 5 is a flowchart depicting further training and usage of the physics-informed neural network.

FIG. 5 is a flowchart depicting further training and usage of the physics-informed neural network. FIG. 5 processing commences at 500 and shows the steps taken by a process that trains a physics-informed neural network to rapidly generate high-resolution images from low-resolution images. At step 510, the process imports low-resolution, sparsely-sampled images in some physics domain, such as fluid flows, weather, combustion, phase changes, etc. At step 520, the process determines from theory what the relevant physics equations are for the domain. At step 530, the process determines which of these equations should be part of the constructed NN and which should be part of the loss function. At step 540, the process takes the provided method and equations to construct a physics-informed NN, inserting one or more relevant equations into the NN, and one or more relevant other equations into the loss function. At step 550, the process trains the physics informed NN to generate high-resolution, dense-time-sampling images using the imported images. At step 560, the process uses the trained NN to super-resolve and super-sample other images in the same physics domain. FIG. 5 processing thereafter ends at 570.

Figure 6:
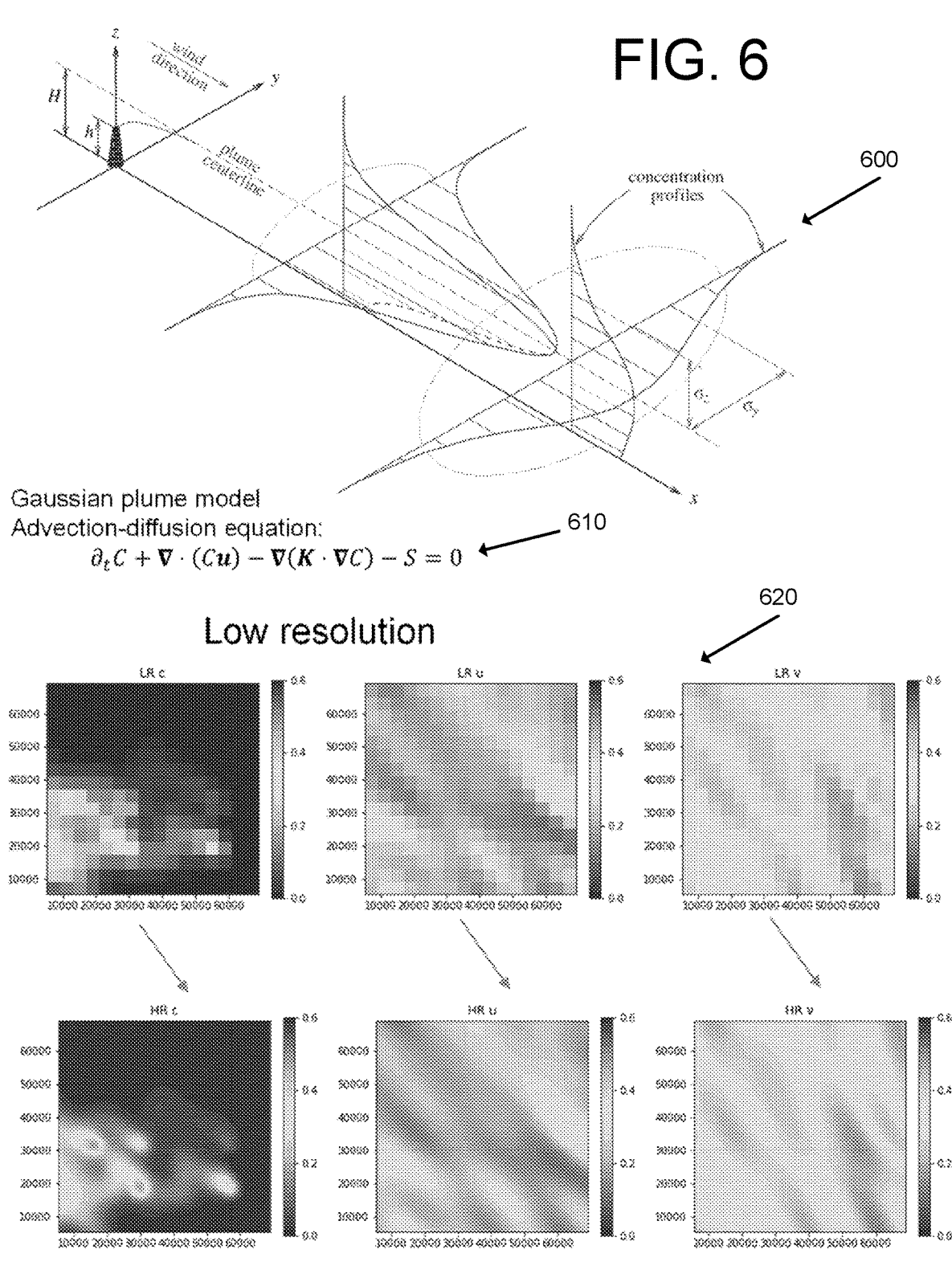
FIG. 6 is a diagram depicting an example of the physics-informed neural network being applied to a Gaussian plume model and resulting high-resolution images created by the neural network.

FIG. 6 is a diagram depicting an example of the physics-informed neural network being applied to a Gaussian plume model and resulting high-resolution images created by the neural network. Diagram 600 depicts a plume, such as a pollutant, being disbursed from a source in a direction according to winds that were occurring at the time (e.g., wind direction, wind speed, etc.) Physics equation 610 depicts a physics advection-diffusion equation for a Gaussian plume model that would apply to the depiction shown in diagram 600. Finally, images 620 show low resolution images on the top row that have been converted, by the physics-informed neural network described herein, to high-resolution images shown on the bottom row.

FIG. 7 is a diagram depicting the physics-informed neural network, the hidden state of the neural network, and the governing equations in a Gaussian plume model to identify a pollution source. Starting with the first-time step of low-resolution data, $L_T$, the approach interpolates large pixels into smaller subpixels, making a higher resolution image, using standard interpolation methods, and in this manner makes a "guess" for what the high-resolution image at the same time T would be. An example of this step is shown in FIG. 7 arrow 710 of neural network model 700 that shows an upward arrow from circle 720 in the lower left corner (labeled $L_T$) to the middle-left circle 725 labeled $I_t$ (lower-case "el" sub "t"). Then, in step 2, NN 730 takes the image $I_t$ and generates a high-resolution image for the next time step "t+1" by incorporating physics, making a more realistic high-resolution image, $H_{t+1}$. Step 2 is represented by the upward arrow 735 from the left middle NN square in the figure to the left upper circle in the figure, labeled $H_{t+1}$.

The next step, step 3, interpolates in time to another high-resolution spatially-interpolated guess image $I_t$, i.e., to the next time step, $I_{t+1}$, and again to a further time step $I_{t+2}$ and so on in the middle row of NN model diagram 700 on FIG. 7, continuing in this way until the time of the next ground-truth low resolution image, which is T+1. In FIG. 7, there are three forward time interpolations labeled $I_{t+1}$, $I_{t+2}$ and $I_{t+3}$. The number of interpolated times can be specified by the user. This calculation step is represented by the diagonal arrows from the lower left-hand circle 720 to the next-to-left circle in the middle row and so on, pointing diagonally to the other circles in the middle row. And also diagonal arrows from the $L_{T+1}$ ground-truth low resolution image (circle 740) to the intermediate-time high-resolution guess images in middle row 750. The number of intermediary time steps depends on the desired time frequency of high-resolution images in the final result. More intermediate steps produce a final result at higher time frequency.

In one embodiment, the time interpolation for the high-resolution guesses shown in middle row 750 is done entirely from the ground truth data, as the diagonal arrows connecting the lowest row to the middle row show. Also, the high-resolution fit data in top row 760 is in fact used for the next time step high resolution fit result.

The next step is that the NN (e.g., NN 730, etc.) inputs the interpolated high-resolution guess for timestep t+1, namely $I_{t+1}$, and makes a high-resolution image for the next interpolated time, $H_{t+2}$ using the NN with the physics constraints. This continues for the intermediate time steps, t+2 and t+3 in the figure, until the time of the next ground-truth data, which is T+1. That is, time t+3 input to the NN in row 730 correspond to time T+1 in the bottom row of ground truths. When the NN has made the high-resolution image for t+3, namely $H_{t+3}$, it blurs this to the low resolution of the ground truth image at the same time, $L_{T+1}$, and a "data loss" made from the rms deviation between the blurred $H_{t+3}$ image and the input $L_{T+1}$ image, summed with all the previous rms deviations like this, contributes to train the NN. In addition, a "physics loss" calculates the deviation of the high-resolution $H_{t+3}$ image from a second physics constraint, separate from the physics constraint used in the NN, and sums this deviation for the present time and all previous times including the intermediate times. The total loss function combines the data loss and the physics loss. Note that, in one embodiment, the intermediate high-resolution images $H_{t+1}$ and $H_{t+2}$ are not used for physics training, and in this embodiment only the high-resolution images at the times of the ground truth low-resolution images are used for training the NN.

This procedure then continues for as long as there is ground-truth low-resolution data (e.g., lower circles 720, 740, etc.). The NN learns the conversion from low-resolution low-frequency data to high-resolution high-frequency data. In a practical application, these steps might be performed using many thousands of images or image pieces to train the NN.

Limitations found in prior approaches have been addressed by the approach described herein. For example, in previous approaches there was no attempt to convert the low time-frequency input data to high time-frequency output data. That is, there was no super-resolution in time to accompany the super-resolution in space. Previous approaches determined super-resolved spatial images only at the timesteps where there was training data at lower resolution. In contrast, this approach includes of a method to obtain high time-frequency output that is a major improvement over previous approaches. This approach also uses the NN to evaluate quantities in the Navier-Stokes equation, unlike other approaches. Previous approaches only used an equation in the loss function, such as the conservation of mass, i.e., the advection (movement of material) equation and ignored the conservation of momentum (Navier-Stokes).

This approach further provides "governing equations" 770 shown in FIG. 7. The first equation "mass conservation of pollutant" is the advection diffusion equation. However, the next two equations are called "momentum conservation". These are the Navier-Stokes equations, or sometimes called the force equations, or sometimes called the momentum equations for fluid flow. Note that they say that the velocities v and u on the left have time derivatives, which means acceleration, and that is determined by the terms on the right of the equal sign which is the pressure gradient (dp/dx, etc.) and the terms with two velocities, u(du/dx1), v(du/dx2), etc. These are inertial terms which say that the motion resists acceleration or going around a corner because the fluid has inertia. These momentum conservation equations also have a diffusion component and a possible source term f(x,t), which could be any additional force such as gravity or a wall that the fluid comes up against.

The last equation in equations 770 in FIG. 7 is called "mass conservation of wind". This equation says that under some conditions or approximations, the fluid cannot contract or expand because it is incompressible. Unlike prior approaches, the "momentum conservation" equations are utilized by the NN itself. This is not a small difference, as is described further above. In addition, this approach is not just adding another equation to a previous result. This is an important equation, as conservation of momentum is essential, but there is more to the approach than simply adding another equation to a loss function.

FIG. 8 is a diagram depicting a typical numerical solution to a transport equation, an update to the rule of the physics state in the physics-informed neural network, and additional equations used in one embodiment. A third notable improvement of this approach is found in equations 800 shown in FIG. 8. In the last equation of 800 there are DNN and $F_{NN}$ terms. The steps above this equation go from the advection-diffusion equation to a time-stepping equation $psi_{t+1}=qjpsi_t-$ delta t . . . where the L stands for the term in the top equation that is del dot sigma dot del psi. This is a Laplacian derivative and so this term is labelled L. So, the second equation of 800 is the discretized version of the first equation with the Laplacian derivative in the first equation written symbolically as L. Note that this L term in the second line is multiplied by psi at t+1, not at t like all the other terms on the right. Thus this $psi_{t+1}$ can be brought over to the left side and combined with the $psi_{t+1}$ there and made into a difference (1−delta t*L), and then both sides of the equation can be divided by that (1−delta t*L) to give the third line of equations 800 shown in FIG. 8. In this Figure, that 1 is written as I (capital "eye") and that represents the identity. We can think of the bold terms, I, L, D and q as matrices that cover the 3 dimensions of the problem. Or we can think of them as operators that act on the variables to their right. So, in making this step from line 2 to line 3 of equations 800 of FIG. 8, the approach keeps the advection term explicit inside the curly bracket: this is the $u_t D_x psi_t + v_t D_y psi_t$ term which is subtracted from $psi_t$ in the curly brackets. So, the equation says that the next time step, t+1, for the image, psi, is the inverse of (I-delta t*L) times a function of the current time t.

The parameters to fit are the diffusion, which is inside the L term, and the source of the pollution, which is inside the q. Going now to the $4^{th}$ row of equations 800, this first term and the q term are converted into trainable NNs, namely the first term goes to DNN and the second term goes to $F_{NN}$. This is a novel aspect of the approach. In essence, the approach has taken the unknown parts, the parts that have to be fitted to the ground truth data, and put them in trainable NNs, so that the ground truth can train the NN to represent what these parts are. And we took the known part, which is the convection, i.e. basic physics, explicitly in the arithmetic used for training, i.e., inside the curly bracket. Thus, unlike previous approaches, the advection is not used in the loss function for our approach, but in the NN itself. In the approach described herein, the advection part is "hard wired" into the NN solution, meaning it is part of the NN arithmetic and cannot be violated even with a noise error. This is in contrast to previous approaches where the advection part is only approximated by minimizing the deviation between the advection amount and the NN result amount, but this minimization is never zero as it is in the approach described herein. This zeroing of some of the physics deviation for the disclosed approach is a significant and novel step forward in physics-informed NNs.

The approach utilizes a loss function that is shown in equations 820 on FIG. 8. The loss function is called script L sub data (the "data misfit" term). The approach also adds a "mass conservation" loss function.

As discussed above, previous approaches provide a NN architecture, details of which are not important, and encode the physics in the loss function. By encoding the physics in the loss function, previous approaches apply what we can describe as a "soft physics constraint" on the solution, because the physics is not followed exactly, it is only followed to some small rms deviation that gets lower and lower with training but is never a zero loss. As a result, there is no guarantee that the result is actually following the physics. In contrast, the approach described herein puts at least some of the physics, such as the advection part, right into the NN itself and solves for the weights of the NN such that this included physics is always exactly followed. There is zero loss for this part of the physics. While some physics is covered in a loss function, the physics covered in the loss function is simpler physics (e.g., the mass conservation mentioned in equations 820 on FIG. 8).

The approach described herein can be thought of as NN-included physics being "hard wired" into the NN, in the sense that it cannot be violated. This approach can thus be generalized as a method to include some, or possibly all, of the physics in a set of data, such as images of natural phenomena which behaves according to physical principles, inside the NN itself and not simply as part of a NN loss function, and the rest of the physics, if it is not all part of the NN, in the loss function, combined with the data loss, which is the typical aspect on which a NN is trained.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by a processor coupled to a memory, comprising:
    receiving a plurality of low-resolution images, each of the low-resolution images depicting a physics event;
    interpolating two adjacent low-resolution images to a higher spatial-resolution interpolated image between a first and a second time;
    inputting a previous high-resolution image and the interpolated image to a neural network that includes a first physics constraint that corresponds to the physics event;
    receiving, from the neural network, a new high-resolution image that corresponds to the inputted previous high-resolution image and the interpolated image;
    comparing one of the low-resolution images at a first time with the new high-resolution image; and
    evaluating a loss function corresponding to a combination of the compared images and a deviation that is based on the new high-resolution image from a second physics constraint, the evaluated loss function resulting in a loss value.

2. The method of claim 1 further comprising:
    until the loss value reaches a low threshold:
        adjusting a weighting used by the neural network; and
        reperforming the interpolating, the inputting, the receiving, the comparing, and the evaluating.

3. The method of claim 2 wherein the neural network is trained when the loss value reaches the low threshold.

4. The method of claim 3 further comprising:
    receiving a second plurality of low-resolution images corresponding to a plurality of time-based events that are affected by the first and second physics constraints;
    inputting the second plurality of low-resolution images to the trained neural network; and

receiving, from the trained neural network, a set of high-resolution images that correspond to the second plurality of low-resolution images.

5. The method of claim 4 wherein the low-resolution images are satellite images of an air pollution disbursement from a pollution source, and wherein the first physics constraint includes one or more advection-diffusion equations.

6. The method of claim 5 wherein the second physics constraint includes one or more conservation equations.

7. An information handling system comprising:
    one or more processors;
    a memory coupled to at least one of the processors; and
    a set of instructions stored in the memory and executed by at least one of the processors to perform actions comprising:
        receiving a plurality of low-resolution images, each of the low-resolution images depicting a physics event;
        interpolating two adjacent low-resolution images to a higher spatial-resolution interpolated image between a first and a second time;
        inputting a previous high-resolution image and the interpolated image to a neural network that includes a first physics constraint that corresponds to the physics event;
        receiving, from the neural network, a new high-resolution image that corresponds to the inputted previous high-resolution image and the interpolated image;
        comparing one of the low-resolution images at a first time with the new high-resolution image; and
        evaluating a loss function corresponding to a combination of the compared images and a deviation that is based on the new high-resolution image from a second physics constraint, the evaluated loss function resulting in a loss value.

8. The information handling system of claim 7 wherein the actions further comprise:
    until the loss value reaches a low threshold:
        adjusting a weighting used by the neural network; and
        reperforming the interpolating, the inputting, the receiving, the comparing, and the evaluating.

9. The information handling system of claim 8 wherein the neural network is trained when the loss value reaches the low threshold.

10. The information handling system of claim 9 wherein the actions further comprise:
    receiving a second plurality of low-resolution images corresponding to a plurality of time-based events that are affected by the first and second physics constraints;
    inputting the second plurality of low-resolution images to the trained neural network; and
    receiving, from the trained neural network, a set of high-resolution images that correspond to the second plurality of low-resolution images.

11. The information handling system of claim 10 wherein the low-resolution images are satellite images of an air pollution disbursement from a pollution source, and wherein the first physics constraint includes one or more advection-diffusion equations.

12. The information handling system of claim 11 wherein the second physics constraint includes one or more conservation equations.

13. A computer program product comprising:
    a computer readable storage medium comprising a set of computer instructions that, when executed by a processor, are effective to perform actions comprising:

receiving a plurality of low-resolution images, each of the low-resolution images depicting a physics event;

interpolating two adjacent low-resolution images to a higher spatial-resolution interpolated image between a first and a second time;

inputting a previous high-resolution image and the interpolated image to a neural network that includes a first physics constraint that corresponds to the physics event;

receiving, from the neural network, a new high-resolution image that corresponds to the inputted previous high-resolution image and the interpolated image;

comparing one of the low-resolution images at a first time with the new high-resolution image; and evaluating a loss function corresponding to a combination of the compared images and a deviation that is based on the new high-resolution image from a second physics constraint, the evaluated loss function resulting in a loss value.

14. The computer program product of claim 13 wherein the actions further comprise:

until the loss value reaches a low threshold:
adjusting a weighting used by the neural network; and
reperforming the interpolating, the inputting, the receiving, the comparing, and the evaluating.

15. The computer program product of claim 14 wherein the neural network is trained when the loss value reaches the low threshold.

16. The computer program product of claim 15 wherein the actions further comprise:

receiving a second plurality of low-resolution images corresponding to a plurality of time-based events that are affected by the first and second physics constraints;

inputting the second plurality of low-resolution images to the trained neural network; and receiving, from the trained neural network, a set of high-resolution images that correspond to the second plurality of low-resolution images.

17. The computer program product of claim 16 wherein the low-resolution images are satellite images of an air pollution disbursement from a pollution source, wherein the first physics constraint includes one or more advection-diffusion equations wherein the second physics constraint includes one or more conservation equations.

* * * * *